United States Patent
Baumgaertner et al.

(10) Patent No.: US 9,573,651 B2
(45) Date of Patent: Feb. 21, 2017

(54) METHOD AND DEVICE FOR DETECTING A MAINTENANCE SITUATION IN A TWO-WHEELED VEHICLE

(71) Applicant: Robert Bosch GmbH, Stuttgart (DE)

(72) Inventors: Daniel Baumgaertner, Tuebingen (DE); Jakob Kleinbach, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/760,786

(22) PCT Filed: Nov. 26, 2013

(86) PCT No.: PCT/EP2013/074690
§ 371 (c)(1),
(2) Date: Jul. 14, 2015

(87) PCT Pub. No.: WO2014/111186
PCT Pub. Date: Jul. 24, 2014

(65) Prior Publication Data
US 2015/0360747 A1    Dec. 17, 2015

(30) Foreign Application Priority Data
Jan. 15, 2013  (DE) .......................... 10 2013 200 485

(51) Int. Cl.
*G06F 19/00* (2011.01)
*B62M 6/50* (2010.01)
*B62M 6/45* (2010.01)
*B62J 27/00* (2006.01)

(52) U.S. Cl.
CPC ................ *B62M 6/50* (2013.01); *B62J 27/00* (2013.01); *B62M 6/45* (2013.01); *B62K 2207/02* (2013.01); *B62K 2207/04* (2013.01)

(58) Field of Classification Search
None
See application file for complete search history.

(56) References Cited

U.S. PATENT DOCUMENTS

| | | | |
|---|---|---|---|
| 6,260,649 B1 | 7/2001 | Carney | |
| 6,739,421 B1 | 5/2004 | Miya | |
| 7,598,909 B2 * | 10/2009 | McBurney | G01S 19/03 342/357.62 |

(Continued)

FOREIGN PATENT DOCUMENTS

| | | |
|---|---|---|
| CN | 101 722 858 | 6/2010 |
| DE | 10 2010 005040 | 7/2011 |

(Continued)

OTHER PUBLICATIONS

International Search Report for PCT/EP2013/074690, dated Mar. 11, 2014.

*Primary Examiner* — Adam Alharbi
(74) *Attorney, Agent, or Firm* — Gerard Messina

(57) ABSTRACT

In a method for detecting a maintenance situation on a two-wheeled vehicle having a motor provided in order to assist forward motion of the two-wheeled vehicle at least at times, a maintenance situation is detected by sensing the position of the two-wheeled vehicle by way of a first sensor variable. Control is then applied to the motor either as a reduction in the applied drive power output, e.g. in the form of the motor speed or torque, or as a complete shutoff or immobilization of the motor.

6 Claims, 3 Drawing Sheets

(56) References Cited

U.S. PATENT DOCUMENTS

2011/0302078 A1* 12/2011 Failing .................... B60L 3/00
                                                                      705/39
2012/0146429 A1    6/2012 Seol
2013/0313896 A1* 11/2013 Gless ................... B60L 3/0046
                                                                      307/10.1

FOREIGN PATENT DOCUMENTS

| | | |
|---|---|---|
| DE | 10 2010 028648 | 11/2011 |
| DE | 10 2012 201 881 | 1/2013 |
| EP | 0 697 330 | 2/1996 |
| EP | 2 028 098 | 2/2009 |
| JP | 2010 221769 | 10/2010 |
| WO | WO 03/022671 | 3/2003 |

* cited by examiner

METHOD AND DEVICE FOR DETECTING A MAINTENANCE SITUATION IN A TWO-WHEELED VEHICLE

BACKGROUND OF THE INVENTION

1. Field of the Invention

The invention relates to a method and an apparatus for assisting maintenance in the context of a motor-driven two-wheeled vehicle.

2. Description of the Related Art

In the context of maintenance of a two-wheeled vehicle it is sometimes necessary to turn the bicycle upside down in order to gain better access to the parts requiring repair. When repairing a flat tire, for example, it is usual firstly to invert the bicycle in order to place it on the saddle and the handlebars, before removing the front or rear wheel. This facilitates removal of the wheel for replacement of the tire.

In such a situation it can happen, however, that the motor of a driven two-wheeled vehicle unintentionally becomes activated, so that a rotation of the pedal cranks, or a rotation of the rear wheel via the chain, occurs. If the rider is working on the rear wheel in this situation, undesirable injuries can occur.

The published German patent application document DE 10 2012 201 881 A1, discloses a control assemblage for an electric bicycle in which an electric motor for driving the electric bicycle is enabled as a function of signals of an acceleration sensor. The drive system is thus enabled when the signals of the acceleration sensor suggest the presumption that the electric bicycle is moving. It is additionally possible to ascertain whether a pressure is being exerted on the pedals.

BRIEF SUMMARY OF THE INVENTION

The present invention describes a method for detecting a maintenance situation on a two-wheeled vehicle as well as an apparatus for carrying out such a method. The essence of the invention is that the motor that is located on the two-wheeled vehicle, and is provided in order to assist forward motion of the two-wheeled vehicle at least at times, has control applied to it as a function of the detected maintenance situation. A maintenance situation of this kind can be detected by sensing the position of the two-wheeled vehicle, i.e. the orientation of the two-wheeled vehicle with reference to the ground or the roadway, by way of a first sensor variable. Control is then applied to the motor either as a reduction in the applied drive power output, e.g. in the form of the motor speed or torque, or as a complete shutoff or immobilization of the motor.

Specifically in the case of two-wheeled vehicles such as bicycles, pedelecs, e-bikes, or e-scooters, in the context of a breakdown it is often necessary to turn the two-wheeled vehicle upside down in order to gain access to the wheels so as to repair the tires. The advantage of the method according to the present invention and of a corresponding apparatus is that in such a maintenance situation the rider need not worry about the risk of being struck or injured by the automatically rotating pedal cranks. In addition, the invention can also be used to detect a tipover, so that the motor is automatically switched off or interrupted after an accident.

In an embodiment of the invention, provision is made that the position is sensed by way of the change in an acceleration variable or in an inclination variable of the two-wheeled vehicle.

It is particularly advantageous if the maintenance situation is detected by the fact that the sensed position variable for characterizing the position the two-wheeled vehicle exceeds a first threshold value.

Provision can furthermore be made that a second sensor variable, which together with the first sensor variable characterizes a maintenance situation, is sensed. It is thus conceivable that in addition to the first sensor variable that characterizes the position of the two-wheeled vehicle, a riding-dynamics variable is utilized in order to ascertain whether a maintenance situation can in fact be present. It is thus conceivable that a tilt of the two-wheeled vehicle while riding in fact corresponds not to a maintenance situation but instead to a more or less deliberate leaned position of the two-wheeled vehicle. It is particularly advantageous here if the second sensor variable represents a vehicle-dynamics variable, e.g. a speed variable or an acceleration variable. Here as well, consideration of the second variable or detection of the maintenance situation can be dependent on the fact that a second threshold value associated with the second variable is exceeded. Alternatively, the second sensor variable can also represent a location variable, e.g. a GPS coordinate. Provision can thus be made that a maintenance situation cannot occur on public roads.

In a particular embodiment of the invention, the maintenance situation of the two-wheeled vehicle is detected when the two-wheeled vehicle rotates more than 90° in one of the horizontal axes (longitudinally, transversely) with respect to riding operation. In addition to a repair situation in which the two-wheeled vehicle is placed on the handlebars and the saddle, a tipover forward over the handlebars can thus also be used as an initial position for immobilizing the motor. Alternatively, provision can also be made that the two-wheeled vehicle must tilt more than 110°, 120°, or 130° out of its normal initial position during riding operation.

Provision can further be made that the rider of the two-wheeled vehicle is informed that the shutoff of or reduction in motor power output is about to be or has been effected. This can be accomplished visually, acoustically, or haptically.

Provision can of course be made that the motor is available again after maintenance, in order to assist driving operation, without a manual reset. This can occur by the fact that the position variable falls below the first threshold value and the motor is thus automatically switched back into its normal assistance state.

DETAILED DESCRIPTION OF THE INVENTION

If a tire failure occurs on a two-wheeled vehicle, for example a bicycle 100, the rider usually turns the bicycle upside down by setting it on the saddle and the handlebars in order to gain better access to the tire. In the case of a motor-driven two-wheeled vehicle, for example an electrically driven bicycle such as an e-bike or a pedelec, it can happen that the control device mounted on the handlebars becomes unintentionally switched on. If the pedal cranks and the chain move in this maintenance situation 110, an injury to the rider can easily occur in the context of removal of the wheel or replacement of the tire, for example if, a finger or tool ends up in the spokes. In order to prevent a hazardous situation of this kind during maintenance, according to the present invention a method and an apparatus are described which automatically detect a corresponding maintenance situation and decelerate or entirely immobilize the motor. The essence of the corresponding method is that the maintenance situation, or also a tipover, is detected as a function of at least one sensor variable that characterizes the state or position of the two-wheeled vehicle.

Figure 1:
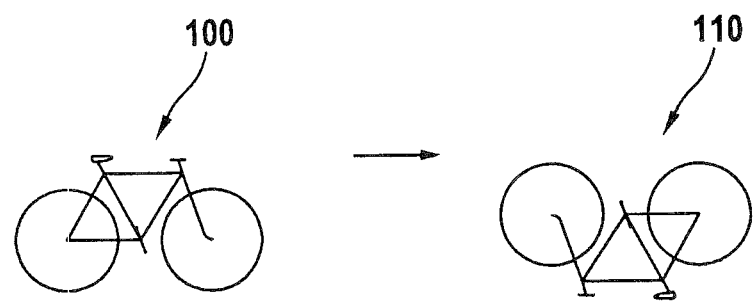
FIG. 1 is a schematic view of a two-wheeled vehicle in a normal state and in a maintenance state.
Figure 2:
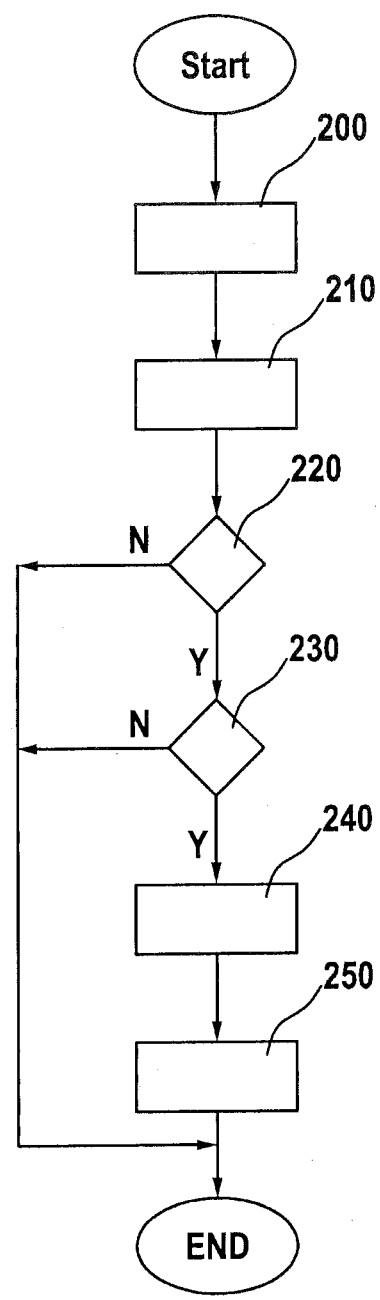
FIG. 2 is a flow chart describing an execution diagram for the method according to the present invention.

A possible method with which maintenance situation 110 can be detected is depicted with reference to the algorithm in FIG. 2. After the algorithm, which can also be executed e.g. in the form of a program in a control unit 300, is started, in a first step a first sensor signal $S_1$ is sensed. This first sensor signal $S_1$ represents the position or orientation of the two-wheeled vehicle preferably during normal riding operation. The first sensor signal $S_1$ can thus represent an inclination of the two-wheeled vehicle with respect to the roadway, or a speed variable or acceleration variable around the longitudinal or transverse axis of the two-wheeled vehicle. In an optional second step 210, a second sensor variable $S_2$ that preferably represents a riding-dynamics variable can be sensed, so that the maintenance situation 110 is sensed redundantly. This can be, for example, a speed variable or acceleration variable in a longitudinal direction or also a torque that is applied by the rider. Alternatively, a location variable, e.g. a GPS location coordinate, can also be sensed.

One or optionally two steps are then provided which ascertain, based on the sensed variables, whether a maintenance situation 110 exists. Step 220 checks whether the first variable $S_1$ exceeds a first threshold value $SW_1$. If an inclination of the two-wheeled vehicle with respect to the ground or the roadway is sensed as a first variable $S_1$, it can then be deduced from the tilt with reference to the longitudinal or transverse axis that the two-wheeled vehicle is no longer located with its wheels on the roadway, and a decision can thus be made to reduce the motor power output or even to shut off or interrupt motor drive, for example as a consequence of maintenance or an accident. Typical values for such a tilt can be angles greater than 60°, 90°, 110°, or 135°. In order to be entirely certain that a maintenance situation of the kind described above does actually exist, values in the range from 160° to 180° can also be used for the first threshold value. Alternatively, a first variable $S_1$ that indicates a tilt of the two-wheeled vehicle can also be derived from the sensors present on the bicycle for speed and acceleration, or from an optional rotation rate sensor. The threshold values must then be selected correspondingly in order to detect the maintenance situation or a tipover. If a maintenance situation is not detected, the method can be terminated.

In the optional next step 230, the sensed sensor variable $S_2$ can be considered in order to sense a maintenance situation or a tipover. This sensor variable $S_2$ serves as a redundancy variable with which the maintenance situation or tipover can be detected more accurately. For example, in addition to a tilt, it is also possible with the first sensor variable $S_1$ to check the extent to which the two-wheeled vehicle is in a "normal" riding mode. If what is sensed as a second sensor variable $S_2$ is, for example, the longitudinal speed, longitudinal acceleration, or the pedaling force or torque or rotation speed of the cranks that is generated by the rider, a distinction can be made between cornering and a maintenance situation. By considering the change over time in the second sensor variable $S_2$ it is moreover possible to infer an accident if, for example, the inclination suddenly increases during a longitudinal acceleration. In this case as well, provision is made to shut off the motor in order to prevent unnecessary injury to the rider.

If a maintenance situation or a tipover is thus detected in step 220 or 230, provision can optionally be made in step 240 that the driver is informed about the detected situation and about imminent throttling or shutoff of the motor, optionally in order to give him or her the opportunity to take countermeasures. This information can be displayed visually on the display of the control unit for the motor, acoustically by way of a warning sound, or haptically by shaking the handlebars. In the last step 250 the motor has control applied to it at least in such a way that the motor speed or torque is reduced. Alternatively, the motor is also entirely immobilized or shut off in order to avoid unnecessary risk to the rider who is working on the two-wheeled vehicle. A pushing aid that is active on the two-wheeled vehicle can optionally also be deactivated.

The method for detecting the maintenance situation 110, or the algorithm described, can be started at regular intervals but also on the basis of a specific situation. It is thus conceivable, for example, to start the method only when a sensor variable S1 that is in any case being sensed exceeds a threshold. In this case the algorithm according to FIG. 2 would be limited to steps 210 to 250, step 220 already having been included in the starting condition. Alternatively, the method can be started as soon as the motor is not active. The query as to the maintenance situation can thus be limited to a situation in which the two-wheeled vehicle is stationary and the rider does not need the drive system.

Figure 3:
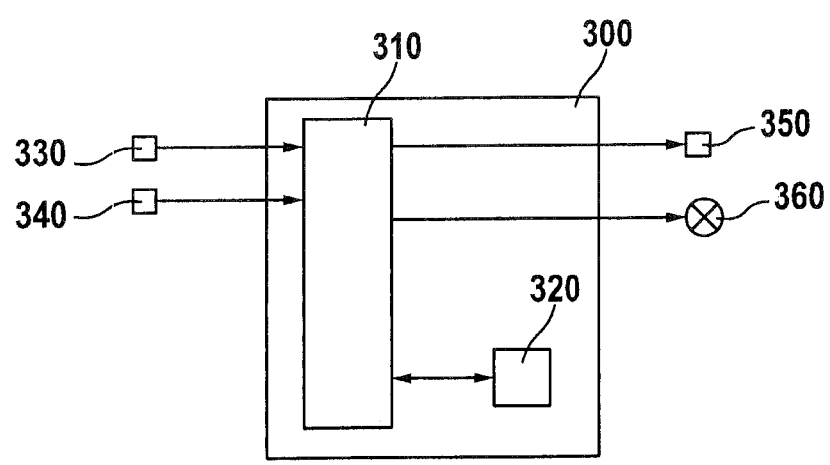
FIG. 3 shows a possible apparatus according to the present invention.

FIG. 3 schematically illustrates the configuration of an apparatus in which the method according to the present invention can execute. Central control unit 300 can be housed inside the control device of the motor or of the electrically driven two-wheeled vehicle. It is also conceivable, however, for the control unit to represent a standalone system that merely uses the sensor variables of the control device. Provided in control unit 300 is a processing unit 310 that senses the sensor variable $S_1$ and optionally $S_2$ from sensors 330 and 340. As a function of threshold values or comparison values stored in a memory 320, processing unit 310 can detect, in accordance with the method described above, whether the two-wheeled vehicle is in a maintenance situation 110. In that case the motor power output is either reduced or brought down entirely to zero. Alternatively, provision can also be made that the application of control to the motor is blocked or interrupted, so that there are no further rotations. It is furthermore possible for the rider to be informed via a corresponding display 360 that the motor is being or has been immobilized or interrupted. This can occur, for example, directly in the display of the control device or by way of an additional display. It is moreover conceivable for a warning sound to be emitted, either before motor drive is interrupted or during the interruption. In order to prevent annoyance by the warning sound during maintenance, provision can be made that said warning sound is emitted only briefly at the beginning of the immobilization or interruption of the motor.

The sensed data for identifying the maintenance situation can likewise be utilized in order to detect an emergency situation (e.g. a tipover). In this case as well, it is advantageous if the motor is immobilized or if application of control to it is interrupted. In some circumstances, additional riding parameters are sensed in order to detect the emergency situation.

What is claimed is:

1. A method for detecting a maintenance situation on a two-wheeled vehicle driven by a motor, comprising:
sensing a position variable representing an orientation of the two-wheeled vehicle in relation to the ground or the road surface on which the two-wheeled vehicle is traveling;
detecting a maintenance situation as a function of the position variable; and
reducing the power output delivered by the motor at least temporarily during the maintenance situation;
wherein the motor is immobilized upon detection of a maintenance situation, and
wherein the maintenance situation is detected as a function of a further vehicle variable representing one of a speed variable or an acceleration variable.

2. The method as recited in claim 1, wherein an acceleration variable or an inclination variable is sensed as the position variable.

3. The method as recited in claim 1, wherein the maintenance situation is detected when the position variable exceeds a first threshold value.

4. The method as recited in claim 1, wherein the maintenance situation is detected in the context of a rolling motion of the two-wheeled vehicle through more than 90°, and wherein the rolling motion is sensed as a function of a riding-dynamics variable.

5. The method as recited in claim 1, wherein upon detection of the maintenance situation, one of (i) the torque generated by the motor is reduced to zero, or (ii) the motor speed is reduced to zero.

6. An apparatus for detecting a maintenance situation on a two-wheeled vehicle driven by a motor, the method comprising:
a sensor for sensing a position variable representing an orientation of the two-wheeled vehicle in relation to the ground or the road surface on which the two-wheeled vehicle is traveling; and
a control unit configured for (i) detecting a maintenance situation as a function of the position variable, and (ii) reducing the power output delivered by the motor at least temporarily during the maintenance situation;
wherein in order to detect the maintenance situation (i) a further vehicle variable representing a speed variable or an acceleration variable is detected, and (ii) the control unit detects the maintenance situation as a function of the further vehicle variable, and
wherein the control unit detects the maintenance situation in the context of a rolling motion of the two-wheeled vehicle through more than 90°, and wherein the rolling motion is sensed as a function of a riding-dynamics variable.

* * * * *